US009642156B2

United States Patent
Eriksson et al.

(10) Patent No.: US 9,642,156 B2
(45) Date of Patent: May 2, 2017

(54) TRANSMITTING RADIO NODE AND METHOD THEREIN FOR SCHEDULING SERVICE DATA FLOWS

(71) Applicant: TELEFONAKTIEBOLAGET L M ERICSSON (PUBL), Stockholm (SE)

(72) Inventors: Ann-Christine Eriksson, Enköping (SE); Paul Stjernholm, Lidingö (SE); Lotta Voigt, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1 day.

(21) Appl. No.: 14/648,156

(22) PCT Filed: Nov. 30, 2012

(86) PCT No.: PCT/SE2012/051333
§ 371 (c)(1),
(2) Date: May 28, 2015

(87) PCT Pub. No.: WO2014/084767
PCT Pub. Date: Jun. 5, 2014

(65) Prior Publication Data
US 2015/0312933 A1 Oct. 29, 2015

(51) Int. Cl.
*H04W 72/12* (2009.01)
*H04L 12/851* (2013.01)
*H04L 12/823* (2013.01)

(52) U.S. Cl.
CPC ......... *H04W 72/1263* (2013.01); *H04L 47/24* (2013.01); *H04L 47/32* (2013.01); *H04W 72/1226* (2013.01)

(58) Field of Classification Search
None
See application file for complete search history.

(56) References Cited

U.S. PATENT DOCUMENTS

2012/0106338 A1* 5/2012 Pongracz ............ H04L 47/2441
370/235
2012/0281564 A1* 11/2012 Zhang ...................... H04L 1/08
370/252

FOREIGN PATENT DOCUMENTS

EP    2273844 A1    1/2011
EP    2448194 A1    5/2012
(Continued)

OTHER PUBLICATIONS

3rd Generation Partnership Project; Technical Specification Group Radio Access Network; Packet Data Convergence Protocol (PDCP) Specification (Release 2000); 3GPP TS 25.323; IEEE, LIS, Sophia Antipolis Cedex; France; vol. 3-R2, No. V4.0.0; Jan. 1, 2001; XP014031331; ISSN: 0000-0001; the whole document.

*Primary Examiner* — Hassan Phillips
*Assistant Examiner* — Omeed D Rahgozar

(57) ABSTRACT

A method in a transmitting radio node for scheduling service data flows within a radio bearer towards a receiving radio node in a radio communications network is provided. The transmitting radio node maps data packets of at least two service data flows within the radio bearer to a respective pre-scheduling queue at a PDCP layer, wherein each pre-scheduling queue is associated with a service or a service quality requirement of the respective service data flow. The transmitting radio node further pre-schedules the data packets of the respective pre-scheduling queue down to a scheduling queue at a RLC or a MAC layer. The transmitting radio node further schedules the data packets in the scheduling queue towards the receiving radio node. The transmitting radio node takes a prebuffer time of a data packet queued in the pre-scheduling queue into account when pre-scheduling and/or scheduling the data packets.

18 Claims, 8 Drawing Sheets

(56) References Cited

FOREIGN PATENT DOCUMENTS

| WO | 2004008698 A2 | 1/2004 |
|----|---------------|--------|
| WO | 2009051420 A2 | 4/2009 |
| WO | 2011100914 A2 | 8/2011 |
| WO | 2013112084 A1 | 8/2013 |

* cited by examiner

TRANSMITTING RADIO NODE AND METHOD THEREIN FOR SCHEDULING SERVICE DATA FLOWS

This application is a 371 of International Application PCT/SE2012/051333, filed Nov. 30, 2012, the disclosure of which is fully incorporated herein by reference.

TECHNICAL FIELD

Embodiments herein relate to a transmitting radio node and a method therein. In particular, embodiments herein relate to schedule service data flows towards a receiving radio node.

BACKGROUND

In today's radio communications networks a number of different technologies are used, such as Long Term Evolution (LTE), LTE-Advanced, Wideband Code Division Multiple Access (WCDMA), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

With the usage of Personal Computer (PC) cards, dongles and the heavy increase in smartphone penetration, the packet data traffic has more or less exploded in the radio communications networks. The mobile broadband traffic over the air interface is currently increasing considerably yearly. The mobile subscribers are using a large variety of services, most of them being Internet services going Over The Top (OTT) on a default bearer, i.e. OTT means that there is no agreement between the service provider and the operator for any specific treatment. Multi-tasking has become frequent, which means that the subscriber is using several services at a time at the user equipment, often multiple Internet services and some without end user intervention, e.g. status updates, emails, etc. during a video session. Being OTT services, without operator control, the services all share the same radio bearer through the Radio Access Network (RAN) to the user equipment, even though the services may have very different quality requirements to achieve a good end user experience.

Currently in the RAN all Quality of Service (QoS) adaptations are done per radio bearer, e.g. scheduling prioritization of data flows are done per radio bearer. RAN functions like Active Queue Management (AQM) and Explicit Congestion Notification (ECN) are thus applied per radio bearer. Statistics for observability purposes are also collected per radio bearer in the RAN.

When an end-user of a user equipment initiates a packet data session accessing the radio communications network a connection is setup between a core network and the user equipment commonly denoted as one bearer service. Several packet data sessions, or service data flows, may be carried by the same bearer service. The bearer service uniquely identifies packet flows, also referred to herein as service data flows, that receive a common QoS treatment between the user equipment and a gateway to the core network, i.e. through the RAN. In e.g. a System Architecture Evolution (SAE)/LTE radio communications network a corresponding bearer service is denoted Evolved Packet System (EPS) Bearer, while in Universal Mobile Telecommunications System (UMTS) a bearer service is defined by a Packet Data Protocol (PDP) Context.

Through the LTE RAN, each bearer service is associated with one E-UTRAN Radio Access Bearer (E-RAB), or for WCDMA RAN, a Radio Access Bearer (RAB), which is associated with one radio bearer. Radio bearer is herein used as a general term for a bearer through the RAN and comprises a radio access bearer, a bearer, or similar. For each radio bearer the same QoS is defined as for the bearer service. All traffic mapped to the same radio bearer receive the same treatment for packet forwarding on a bearer level e.g. scheduling policy, queue management policy, rate shaping policy, Radio Link Control (RLC) configuration. An EPS bearer or PDP Context is mapped to one logical channel, a radio bearer, or a radio access bearer for the different standards, e.g. E-RAB for LTE.

A core network node, e.g. a gateway node, may intercept traffic to perform packet inspection such as Deep Packet Inspection (DPI), flow identification, flow classification or similar, to detect different service data flows. The core network node may then initiate the setup of additional radio bearers in order to separate the different service data flows and to make it possible to differentiate the different service data flows on a service level by assigning different QoS to the different radio bearers based on the service of the different service data flows. But from a RAN perspective there is no guarantee that the process to separate the different service data flows on a radio bearer level actually is done in the core network. A drawback in e.g. WCDMA with the above core network solution is that it requires multiple radio bearers to be set up, which may introduce extra delay when setting up radio bearers in the radio communications network where the setup of radio bearers may be done in sequence. There are also limitations in the number of bearer combinations and number of parallel radio bearers supported by the user equipments and the radio communications network. This results in a reduced performance of the radio communications network.

Thus, the same packet forwarding treatment applies to all packets on a radio bearer even though they may belong to different services and thus have different quality requirements. RAN functions like AQM and ECN is thus applied per bearer and not per service. Statistics for observability purposes are also collected per bearer in RAN.

To allow RAN to differentiate between service flows within a bearer, a pre-scheduler may be introduced in the RAN that schedules data from different service data flows within the same radio access bearer. By doing that there will be two levels of scheduling, the pre-scheduler and the radio scheduler, or scheduler, within RAN and without correlation between the schedulers the wanted quality of service with respect to prioritization and delay requirements is not met. WO 2011/100914 relates to a pre-scheduler of a two layered scheduling mechanism that base the scheduling on priority of the pre-scheduling queues. However, this pre-scheduling results in a solution that queues the packets twice which may lead to a non-optimal service performance for e.g. delay sensitive services in the radio communications network.

SUMMARY

An object according to embodiments herein is to improve the service performance of the radio communications network.

According to an aspect of embodiments herein, the object is achieved by a method in a transmitting radio node for scheduling service data flows within a radio bearer towards a receiving radio node in a radio communications network. The transmitting radio node maps data packets of at least two service data flows within the radio bearer to a respective pre-scheduling queue at a Packet Data Convergence Protocol, PDCP, layer, wherein each pre-scheduling queue is associated with a service or a service quality requirement of the respective service data flow. The transmitting radio node pre-schedules the data packets of the respective pre-scheduling queue down to a scheduling queue at a Radio Link Control, RLC, or a Medium Access Control, MAC, layer. The transmitting radio node schedules the data packets in the scheduling queue towards the receiving radio node. The transmitting radio node takes a prebuffer time of a data packet queued in the pre-scheduling queue into account when pre-scheduling and/or scheduling the data packets.

According to another aspect of embodiments herein, the object is achieved by a transmitting radio node for scheduling service data flows within a radio bearer towards a receiving radio node in a radio communications network. The transmitting radio node comprises a mapping circuit configured to map data packets of at least two service data flows within the radio bearer to a respective pre-scheduling queue at a PDCP layer. Each pre-scheduling queue is associated with a service or a service quality requirement of the respective service data flow. The transmitting radio node comprises a pre-scheduler configured to pre-schedule the data packets of the respective pre-scheduling queue down to a scheduling queue at a RLC or a MAC layer. The transmitting radio node comprises a scheduler configured to schedule the data packets in the scheduling queue towards the receiving radio node. The pre-scheduler and/or the scheduler is configured to take a prebuffer time of a data packet queued in the pre-scheduling queue into account when pre-scheduling and/or scheduling the data packets.

An advantage by taking the prebuffer time into account in the two layer scheduling is that a more optimal flow of the packets within different service data flows may be obtained leading to an improved service performance perceived by the end user.

BRIEF DESCRIPTION OF THE DRAWINGS

Embodiments will now be described in more detail in relation to the enclosed drawings, in which.

DETAILED DESCRIPTION

Figure 1:
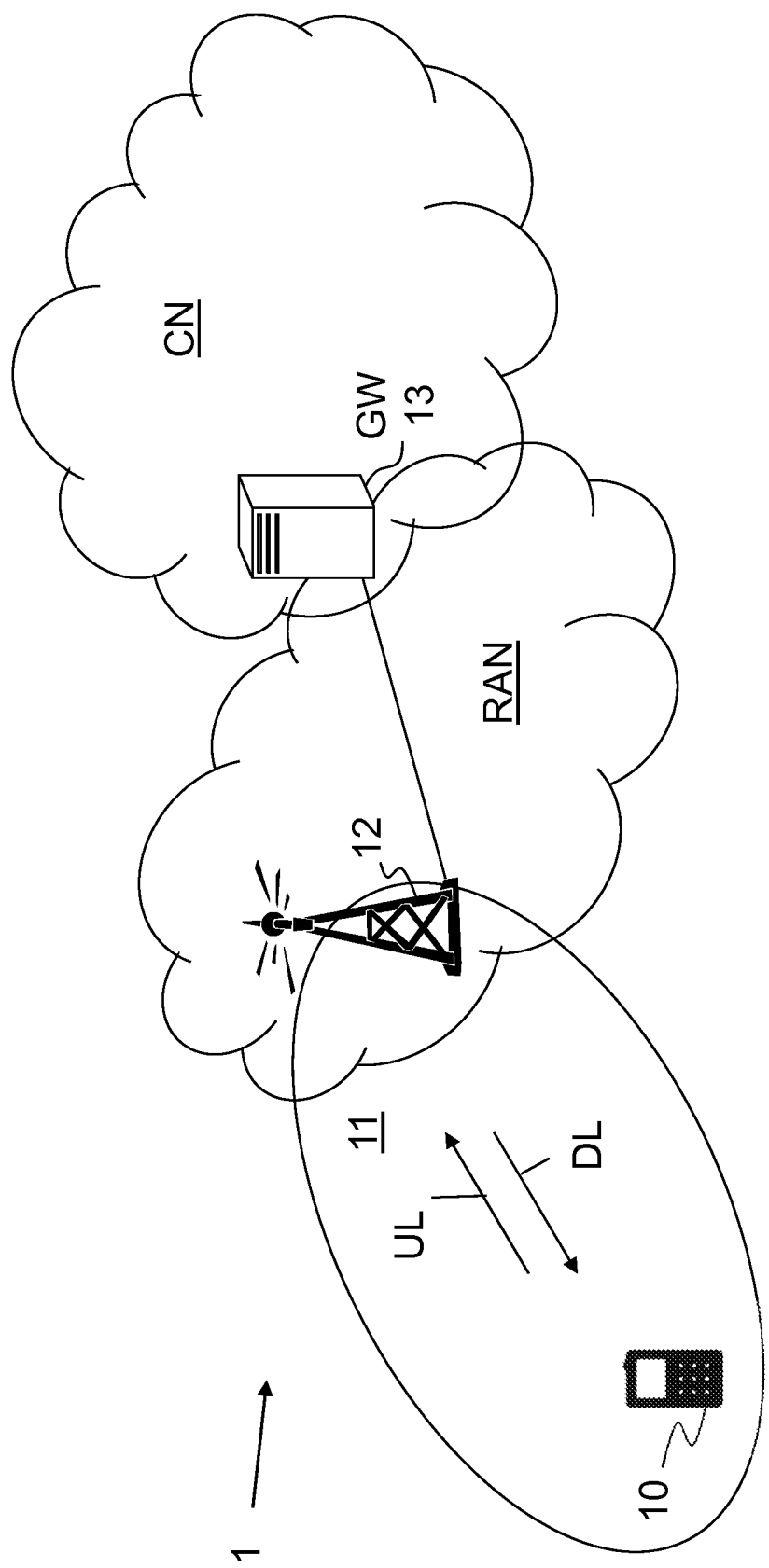
FIG. 1 is a schematic overview depicting a radio communications network according to embodiments herein.

FIG. 1 is a schematic overview depicting a radio communications network 1 according to some embodiments herein. The radio communications network 1 may be an LTE-advanced network, a LTE network, a WCDMA network, a Code Division Multiple Access (CDMA) 2000 network, an Interim Standard 95 (IS-95) network, a Digital-Advanced Mobile Phone Service (D-AMPS) network or similar.

The radio communications network 1 comprises a receiving radio node 10 served in a cell 11. The radio communication network 1 further comprises a transmitting radio node 12 exemplified in FIG. 1 as a radio base station in a Radio Access Network (RAN). The transmitting radio node 12 serves or controls radio resources over a geographical area forming the cell 11. The receiving radio node 10 is served in the cell 11 by the transmitting radio node 12, which receiving radio node 10 being exemplified as a user equipment in the figure. The transmitting radio node 12 and also the receiving radio node 10 may be any node communicating over a radio interface and in the RAN, such as a user equipment or a RAN node, e.g. a Radio Network Controller (RNC), a radio access node, a radio base station, a relay node, a beacon station or similar. In some embodiments herein this means that the transmitting radio node 12 may be a user equipment and the receiving radio node 10 may be a radio base station or an RNC (not shown). Furthermore, the receiving radio node 10 as well as the transmitting radio node 12 are illustrated as single physical entities but it should be understood that the receiving radio node 10 and/or the transmitting radio node 12 may comprise a plurality of physical entities. For example, the transmitting radio node 12 may comprise an RNC and a radio base station.

It should further be understood that the radio base station may also be referred to as e.g. a NodeB, an evolved Node B (eNB, eNode B), a base transceiver station (BTS), an Access Point Base Station, a base station router, or any other network unit capable to communicate with a user equipment within the cell served by the radio base station depending e.g. of the radio access technology and terminology used. The user equipment may be any wireless terminal, device or node e.g. Personal Digital Assistant (PDA), laptop, mobile, sensor, relay, mobile tablets or even a small base station communicating within respective cell. Furthermore, the term RNC should here not be interpreted to strictly so as to comprise only an RNC according to the 3GPP Universal Terrestrial Radio Access Network (UTRAN) standard, but any network control node capable of mapping a data session to different transmission paths through its different ports wherein the different transmission paths exploit different routing protocols. For instance, in case of a CDMA 2000 network, the RNC functionality described according to embodiments herein may be realised in the Base Station Controllers (BSC) of the CDMA 2000 network.

As illustrated, the RAN may provide access to a Core Network (CN) via a gateway node 13.

During a communication session the transmitting radio node 12 may receive a data flow, such as service data flows of different services e.g. multimedia broadcasting and e-mail, within a radio bearer intended for the receiving radio node 10. As stated above 'radio bearer' herein is a general term for a bearer through the access network and comprises radio access bearer, a bearer or similar. By separating the service data flows within the radio bearer into a number of queues on e.g. a Packet Data Convergence Protocol (PDCP) layer based on type of services, a pre-scheduling is used. Pre-scheduling splits the radio bearer queue into two queues; a pre-scheduling queue in e.g. PDCP and a radio scheduling queue in e.g. RLC or Medium Access Control (MAC). Thus, packets are queued twice, but the radio scheduler is only aware of the packets in the RLC/MAC queue. By using correlation between the scheduling queue and the pre-scheduling queue e.g. delay sensitive services will experience an improved service performance, i.e. the delay requirements will be fulfilled since the radio scheduler is made aware of a time or time interval a packet is queued in the pre-scheduler queue, the time is herein called prebuffer time. For services scheduled according to e.g. a proportional fair strategy the radio scheduler is made aware of the prebuffer time in the pre-scheduler queue to fulfill the fairness requirement. Also embodiments herein avoid that congestion actions per queue, e.g. queue management actions such as discarding data packets, may discard "wrong" packets and active queue management actions may be triggered too late if no correlation is made between the two levels of queues.

Embodiments herein provide methods that take the prebuffer time in the pre-scheduling queue into account in at least one of the pre-scheduling and the scheduling of the data packets. This results in that data packets queued in the pre-scheduling may be prioritized either in the pre-scheduling, the scheduling or in both.

Figure 2:
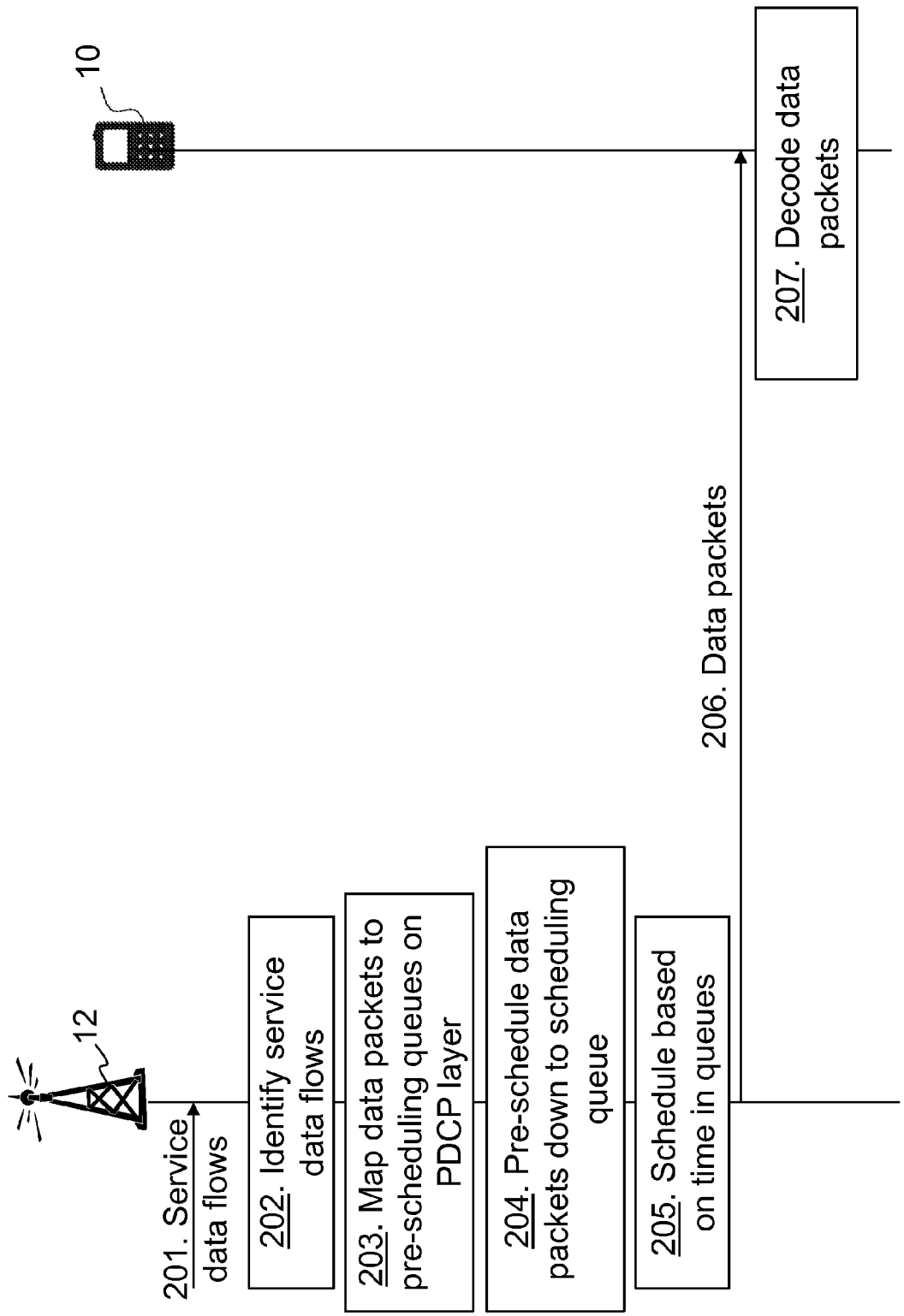
FIG. 2 is a schematic combined flow chart and signalling scheme according to embodiments herein.

FIG. 2 is a combined flow chart and signalling scheme according to embodiments herein. The receiving radio node 10 has a number of services, i.e. service data flows, set up over the radio bearer. With embodiments herein separate pre-scheduling queues per service data flow within the radio bearer are introduced in the PDCP layer.

Action 201. The transmitting radio node 12 receives service data flows within the radio bearer towards the receiving radio node 10. For example, the transmitting radio node 12 receives a service data flow of an Internet media stream as well as an email service over the same radio bearer.

Action 202. The transmitting radio node 12 identifies IP packets or PDCP SDUs of different service data flows. To enable separate treatment of the different service data flows, the transmitting radio node 12 identifies the different service data flows. The PDCP SDUs belonging to different service data flows may e.g. be identified by packet inspection in RAN or service information sent from the CN. With the help of this service information the service and/or its service quality requirement/s, such as QoS requirement, are deduced, and with the help of this service information the service data flow is mapped, see action 203 below, to a relevant pre-scheduling queue. Based on the service information a pre-scheduling algorithm is associated with the pre-scheduling queue, e.g. involving a scheduling priority/weight handling e.g. Internet media before e-mail, providing input to the pre-scheduling decision. The association between the service information and the pre-scheduling algorithm may be configured via an Operations and Maintenance (O&M) system.

Action 203. The transmitting radio node 12 maps the data packets, or PDCP packets or PDCP SDUs, of the different service data flows to pre-scheduling queues at the PDCP layer according to service and/or service quality requirement of the respective service data flow. Each service data flow requiring a unique treatment through the RAN is thus mapped to a separate pre-scheduling queue in PDCP. Service data flows within a radio bearer requiring the same service quality or being of the same service may be mapped to the same pre-scheduling queue. For example, different services with the same service quality requirement may be queued in one pre-scheduling queue.

Action 204. The transmitting radio node 12 then pre-schedules the data packets of the respective pre-scheduling queue down to a scheduling queue at a RLC or MAC layer or scheduler. This pre-scheduling may be based on prebuffer time in the pre-scheduling queue and, in some embodiments, a buffer delay in a scheduling queue at the RLC/MAC layer. The buffer delay is the time until the last data packet in the scheduling queue is scheduled and transmitted. The pre-scheduling may also, alternatively or additionally, be based on the service or the service quality requirements of the pre-scheduling queues.

Action 205. The transmitting radio node 12 then schedules the data packets received at a buffer at the RLC/MAC layer scheduler, also referred to as the radio scheduler or RLC/MAC scheduler, of the transmitting radio node 12 may take the prebuffer time in the pre-scheduling queue of the data packets and may also take the buffer delay in the scheduling queue at the RLC/MAC layer into account when scheduling the data packets of the service data flows.

Action 206. The transmitting radio node 12 may then transmit the data packets to the receiving radio node 10 as scheduled.

Action 207. The receiving radio node 10 receives and decodes the data packets. The receiving radio node 10 is unaffected by the embodiments herein and handles the radio bearer according to legacy, wherein legacy means according to previous systems.

An aim of embodiments herein is to correlate the time spent in queues of a two level scheduler, i.e. a pre-scheduler and a scheduler, such as the two scheduler levels are working together and that service differentiation and per flow scheduling within a bearer becomes possible. Embodiments herein consider the time, i.e. how long time, a data packet is queued as the sum of the queuing time in both levels of scheduler. Another part is to make it possible to compensate for somewhat suboptimal scheduling decisions in the first level of scheduling by dynamically adjusting the second level of scheduling to fulfill the service quality requirements of the service data flows within the radio bearer.

Figure 3:
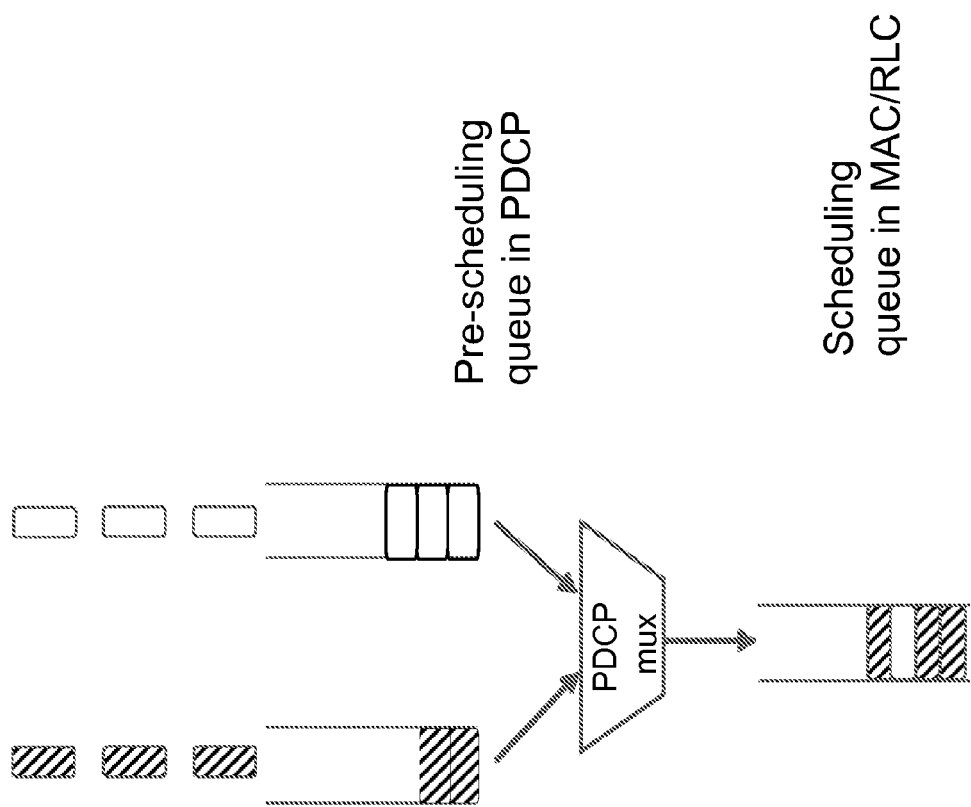
FIG. 3 is a block diagram depicting a two layered scheduling of data packets according to embodiments herein.

FIG. 3 is a block diagram depicting a scheduler with two levels of scheduling queues, one pre-scheduling queue in PDCP and one scheduling queue in RLC or MAC. In the illustrated example a first service data flow and a second service data flow are identified. Data packets of the first service data flow are marked with diagonal lines and data packets of the second service data flow are marked as white packets. A pre-scheduler pushes data packets from each pre-scheduling queue down to the scheduler. The data packets are there buffered in the scheduling queue in RLC/MAC. The scheduler then schedules the data packets in the scheduling queue.

To allow high flexibility when pre-scheduling service data flows, as little data, or as few data packets, as possible should be kept in the scheduling queue, and as much data, or as many data packets, as possible should be kept in the pre-scheduling queues. At the same time, to avoid that the buffer, i.e. the scheduling queue, under-runs when scheduling the receiving radio node 10, there should be just enough data packets in the scheduling queue that will be sent in the coming scheduling period/s. How much data that is required depends on radio link bit rate of each receiving radio node. A higher radio link bit rate requires more data to be queued in the scheduling queue. Embodiments herein take time that data packets have spent in the pre-scheduling queue, i.e. prebuffer time, into account in the scheduling process, i.e. the pre-scheduling and/or the scheduling. Some embodiments also take the time that data packets have spent in the scheduling queue, i.e. the buffer delay.

Figure 4:
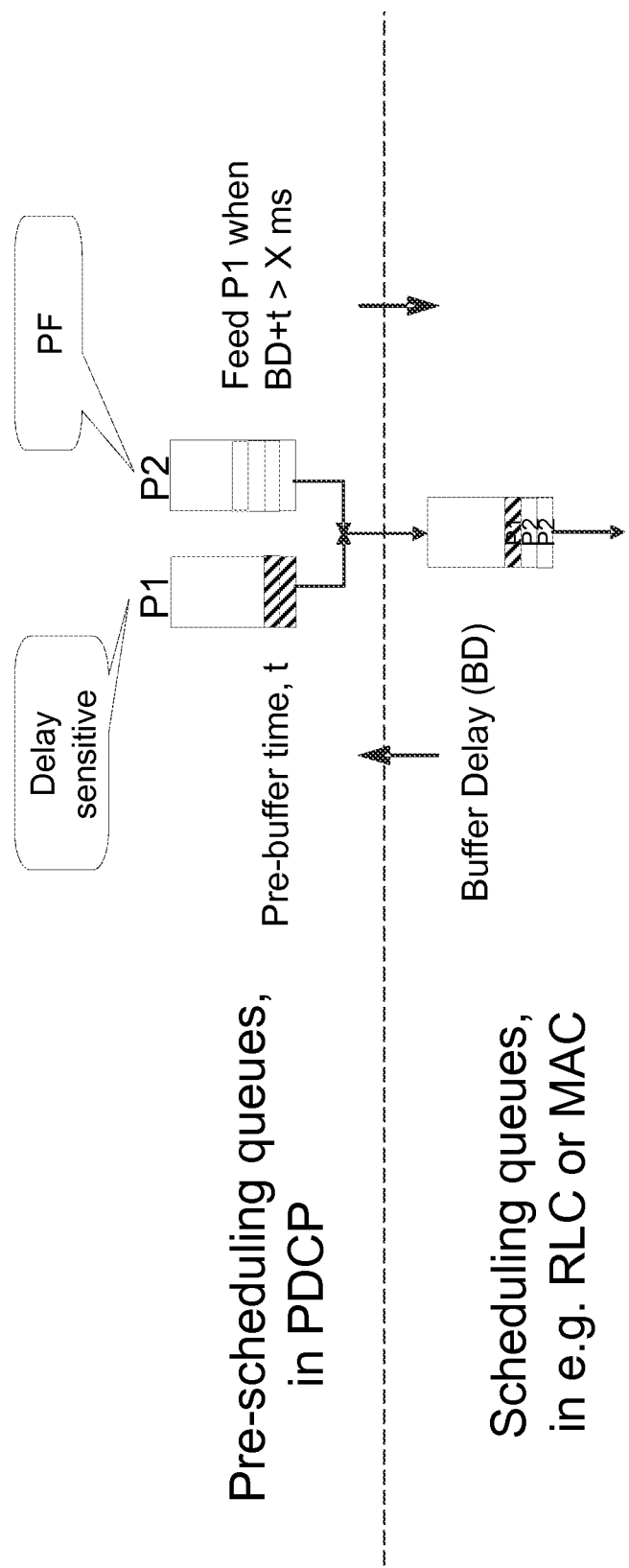
FIG. 4 is a block diagram depicting a two layered scheduling of data packets according to embodiments herein.

FIG. 4 is a block diagram depicting a scheduler with two levels wherein the buffer delay is informed to the pre-scheduler. Data packets of the first service data flow are marked with diagonal lines and data packets of the second service data flow are marked as white packets. To determine the required amount of data in the scheduling queue, the buffer delay, which may be estimated, is sent from the radio scheduler to the pre-scheduler. The buffer delay indicates how long time it will take to transmit the currently queued data in the scheduling queue, i.e. the time it takes to empty the scheduling queue of data packets.

The buffer delay may for example be calculated as:

Buffer Delay (BD)=data volume in queue/achieved radio link bit rate,

The achieved radio link bit rate may be dependent on a priority and/or delay requirements of the data packets in the scheduling queue, which may depend on several service data flows of different priorities and delay requirements.

From the buffer delay information, signaled back to the pre-scheduler, the pre-scheduler may estimate when it is time to send more data down to the scheduling queue and how much data that should be sent, thus, taking into account the buffer delay in the scheduling queue, in addition to the prebuffer time in the pre-scheduling queues. A first pre-scheduling queue is denoted as P1 and a second pre-scheduling queue is denoted as P2. The pre-scheduler feeds down the packets based on the buffer delay in conjunction with the prebuffer time spent in the P1 and/or P2.

The decision may for example be based on if the sum of buffer delay and prebuffer time (t) is greater than a certain time, X ms, then data packets are fed down from pre-scheduling queue P1 to the scheduling queue.

Figure 5:
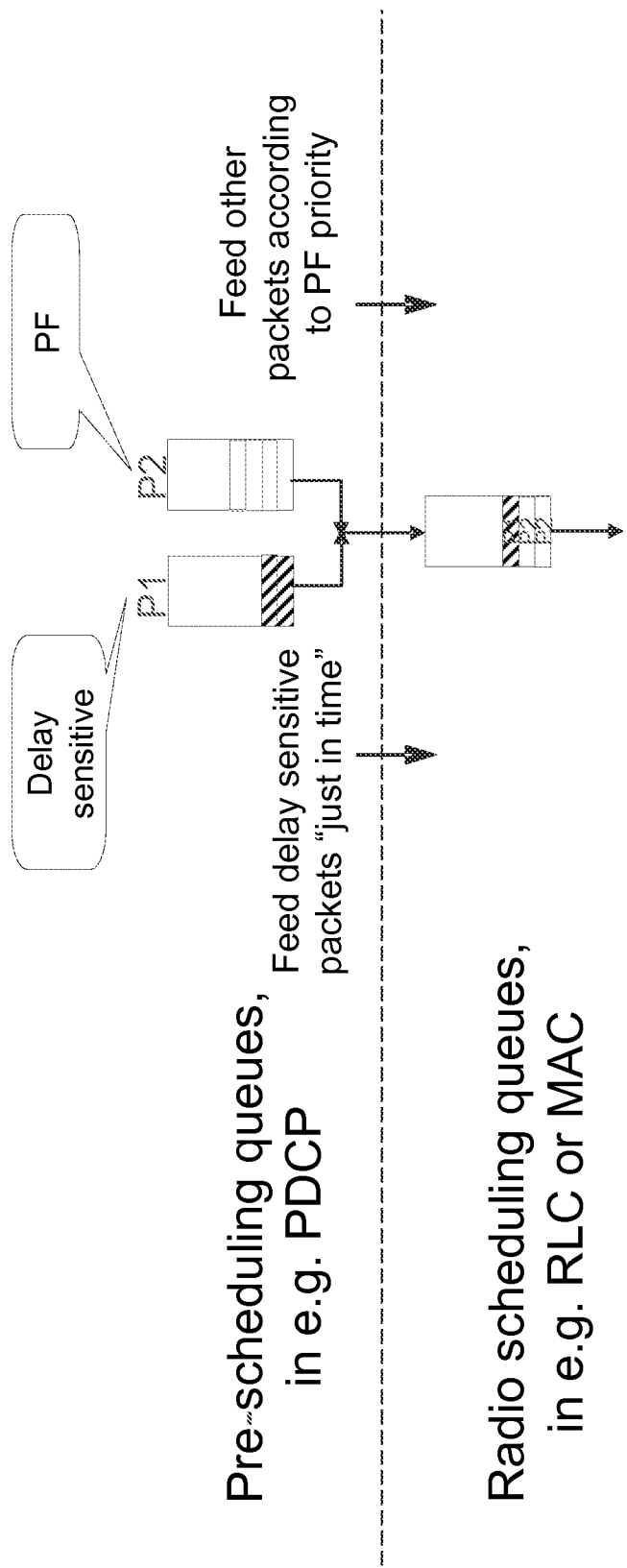
FIG. 5 is a block diagram depicting a two layered scheduling of data packets according to embodiments herein.

FIG. 5 is a block diagram depicting some embodiments, wherein the pre-scheduler of each transmitting radio node 12 may have pre-scheduling queues with different quality of service requirements. For example, a first pre-scheduling queue for data packets of a delay sensitive service and a second pre-scheduling queue of data packets which are of best-effort types which may be scheduled according to a priority with for example a Proportional Fair (PF) algorithm. Data packets of the first service data flow are marked with diagonal lines and data packets of the second service data flow are marked as white packets. The first pre-scheduling queue is denoted as P1 and the second pre-scheduling queue is denoted as P2.

For the delay sensitive flows, from P1, the pre-scheduler should feed the scheduler with delay sensitive packets "just in time", meaning that the delay sensitive data packets may be delayed but within the requirement. Thus, the scheduler may fulfil the delay requirements for that service data flow but also for other service data flows to the same receiving radio node 10 that may be sent meanwhile. According to embodiments herein, the buffer delay together with the prebuffer time, t, of the data packet in the pre-scheduling buffer is used by the pre-scheduler to forward delay sensitive packets to the scheduler, without changing the scheduling policy in the scheduler, while fulfilling a delay requirement D, wherein D≥buffer delay+prebuffer time. This means that a data packet will be delayed buffer delay+prebuffer time, which is less or equally delayed compared to the delay requirement D.

Additional information may be needed by the pre-scheduler to judge the total amount of data packets to be forwarded to the scheduler, such as radio link quality or similar.

If the delay requirement is not fulfilled, i.e. D<buffer delay+prebuffer time, the pre-scheduler may notify the scheduler to dynamically adjust a priority/weight of the scheduling queue in order to fulfil the delay requirement.

Figure 6:
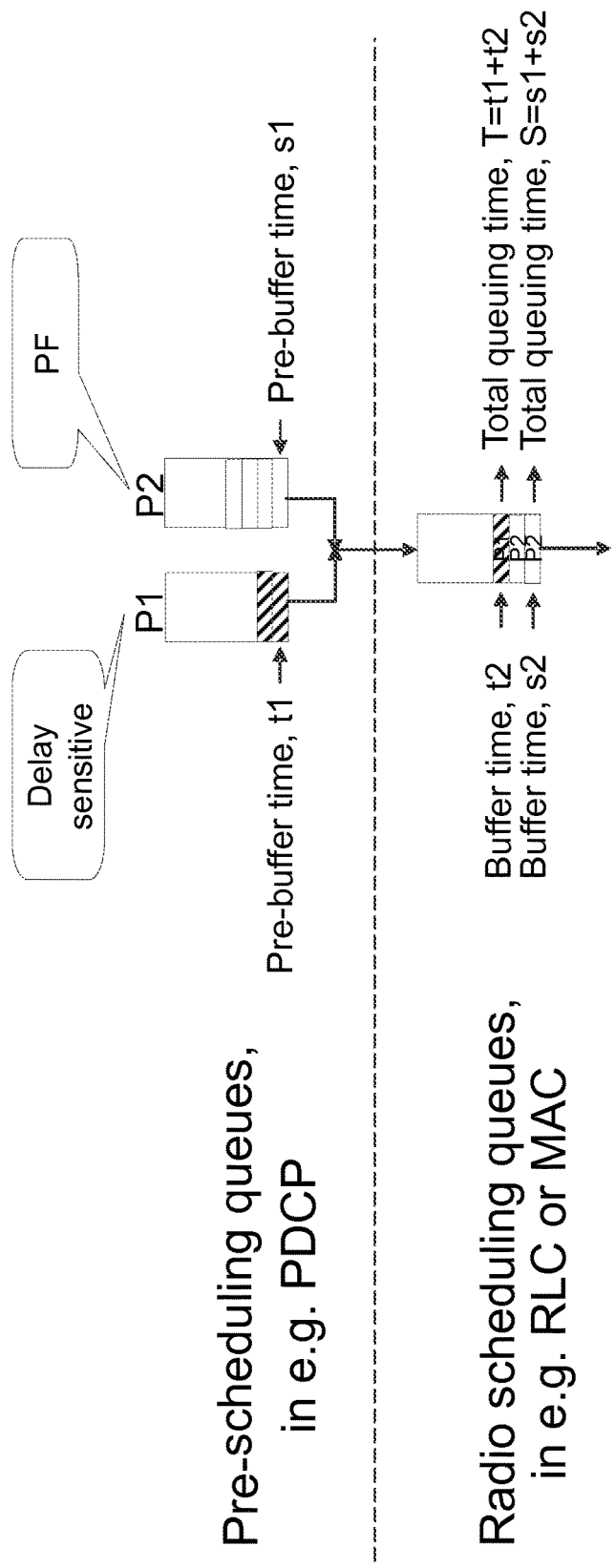
FIG. 6 is a block diagram depicting a two layered scheduling of data packets according to embodiments herein.

FIG. 6 is a block diagram depicting some embodiments, wherein the principle to forward data packets from the pre-scheduler based on buffer delay and prebuffer time may be complemented with a mechanism to guarantee the delay requirement. This may be required when the radio link bit rate per receiving radio node changes and the actual buffer delay in the scheduler is longer than the reported buffer delay. The buffer delay in the scheduling queue for a delay sensitive data packet will then exceed the delay requirement. Data packets of the first service data flow are marked with diagonal lines and data packets of the second service data flow are marked as white packets. The first pre-scheduling queue is denoted as P1 and the second pre-scheduling queue is denoted as P2. The data packets in the first pre-scheduling queue are delay sensitive and the data packets in the second pre-scheduling queue are PF packets.

To fulfil the delay requirement through the RAN for delay sensitive service data flows, the scheduler may consider a total queuing time, i.e. a sum of time in the pre-scheduler, prebuffer time T, and the scheduler, buffer delay BD. The total queuing time may also be used for PF flows to get fairness between flows for different receiving radio nodes. The prebuffer time in the pre-scheduler may be sent to the scheduler from the pre-scheduler for example per each data packet or as an average delay per pre-scheduling queue.

When the scheduler detects that the delay requirements for a delay sensitive data packet in the scheduling queue will not be fulfilled, e.g. when the total queuing time T is greater or equal to the delay requirement D, the scheduler may dynamically adjust the priority/weight of the scheduling queue such that the data packets are transmitted at a higher rate to fulfil the delay requirement. All data packets in the scheduling queue, both delay sensitive and best-effort data packets, will be sent with the higher priority.

Data packets in the first pre-scheduling queue P1 are queued a first time t1. Data packets in the second pre-scheduling queue P2 are queued a second time s1. A data packet from the first pre-scheduling queue P1 is queued a third time t2 in the scheduling queue. A data packet from the second pre-scheduling queue P2 is queued a fourth time s2 in the scheduling queue. The scheduling takes the total time into account when scheduling the data packets, i.e., a total queuing time for a P1 packet is T=t1+t2 and a total queuing time for a P2 packet is S=s1+s2.

Figure 7:
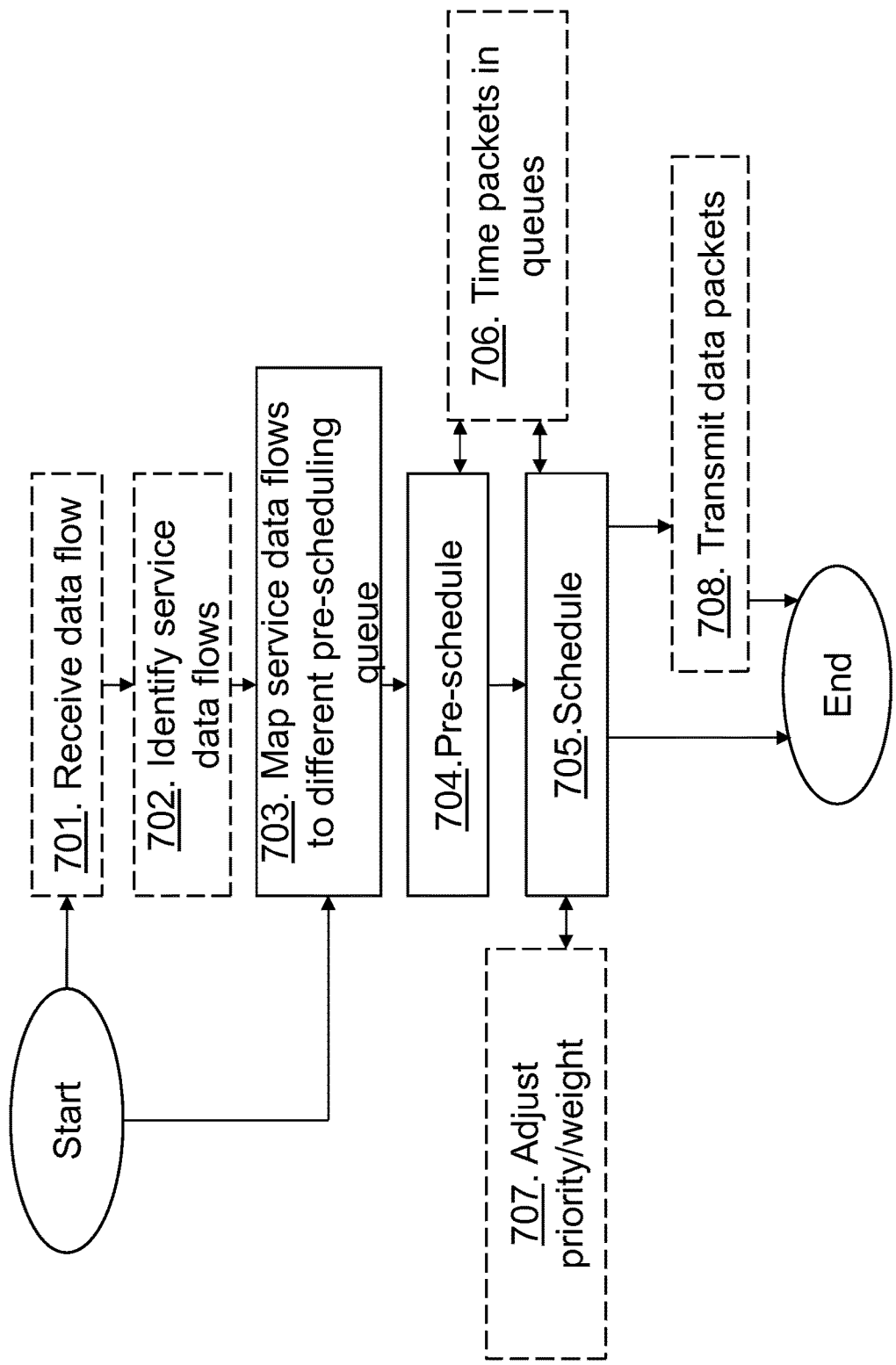
FIG. 7 is a schematic flow chart depicting a method in a transmitting radio node according to embodiments herein.

The method actions in the transmitting radio node 12 for scheduling service data flows within the radio bearer towards the receiving radio node 10 in the radio communications network 1 according to some embodiments will now be described with reference to a flowchart depicted in FIG. 7. The actions do not have to be taken in the order stated below, but may be taken in any suitable order. Actions performed in some embodiments are marked with dashed boxes.

Action 701. According to some embodiments the transmitting radio node 12 receives a data flow comprising a number of service data flows within the radio bearer towards the receiving radio node 10.

Action 702. According to some embodiments the transmitting radio node 12 identifies the at least two service data flows within the radio bearer towards the receiving radio node 10. Each service data flow may be associated with the service and/or the service quality requirement, which service and/or service quality requirement is different for respective service data flow.

Action 703. The transmitting radio node 12 maps the data packets of the at least two service data flows within the radio bearer to the respective pre-scheduling queue at the PDCP layer, e.g. at PDCP layer or at the entrance of the PDCP layer. Each pre-scheduling queue is associated with the service or the service quality requirement of the respective service data flow.

Action 704. The transmitting radio node 12 pre-schedules the data packets of the respective pre-scheduling queue down to the scheduling queue at the RLC or the MAC layer. According to embodiments herein the transmitting radio node 10 takes the prebuffer time of a data packet queued in the pre-scheduling queue into account when pre-scheduling the data packets. The transmitting radio node 10 may further take the buffer delay of the scheduling queue into account when pre-scheduling the data packets down to the scheduling queue. In some embodiments, the transmitting radio node 10 takes the service or the service quality requirement into account when pre-scheduling the data packets down to the scheduling queue. In some embodiments, the transmitting radio node 12 takes the prebuffer time of a data packet queued in the pre-scheduling queue and the buffer delay of the scheduling queue into account when pre-scheduling the data packets down to the scheduling queue to meet a delay requirement associated with respective pre-scheduling queue. E.g. the transmitting radio node 12 may pre-schedule data packets from a non-delay sensitive pre-scheduling queue as long as data packets from a delay sensitive pre-scheduling queue meet the delay requirement.

Action 705. The transmitting radio node 12 schedules the data packets in the scheduling queue towards the receiving radio node 10. The transmitting radio node 10 may take the prebuffer time of a data packet queued in the pre-scheduling queue into account when scheduling the data packets. In further examples, the transmitting radio node 12 may take the prebuffer time of a data packet queued in the pre-scheduling queue and the buffer delay of the scheduling queue into account when scheduling the data packets. The buffer delay in the scheduling queue may be estimated based on data volume in the scheduling queue and radio link rate towards the receiving radio node 10.

Action 706. The transmitting radio node 12 may time the data packet within the pre-scheduling queue to derive the prebuffer time and/or the scheduling queue to derive a buffer time and/or the buffer delay.

Action 707. The transmitting radio node 12 may, based on prebuffer time and buffer delay, dynamically adjust, when a delay requirement of a service data flow is not fulfilled, a priority/weight of the scheduling queue such that data packets are transmitted at a higher rate to fulfil the delay requirement of the service data flow.

Action 708. The transmitting radio node may then transmit the scheduled data packets to the receiving radio node 10.

Figure 8:
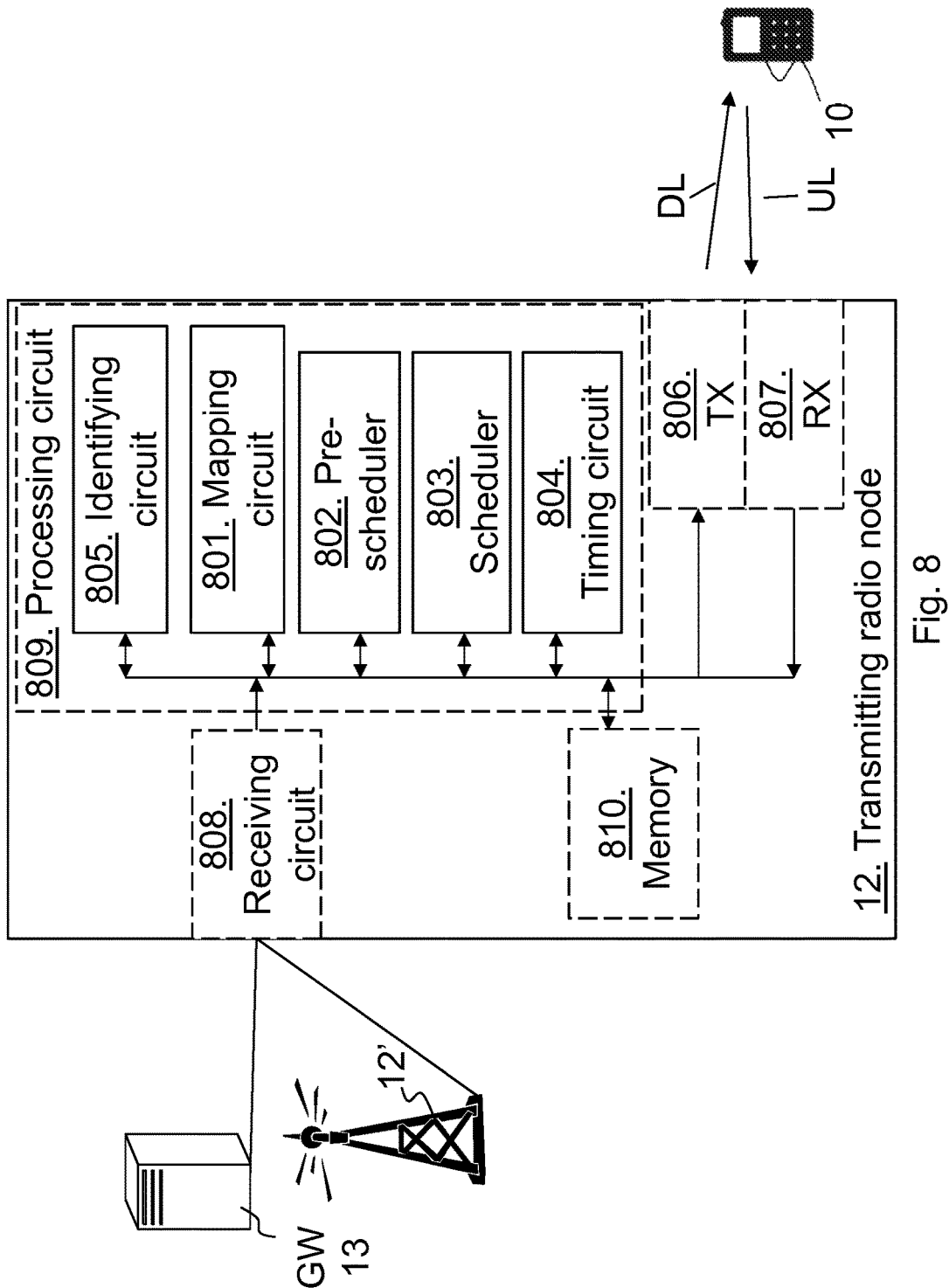
FIG. 8 is a block diagram depicting a transmitting radio node according to embodiments herein.

In order to perform the methods described above for scheduling the service data flows within the radio bearer towards the receiving radio node 10 in the radio communications network 1 the transmitting radio node 12 comprises the following arrangement as shown in FIG. 8.

The transmitting radio node 12 comprises a mapping circuit 801 configured to map data packets of at least two service data flows within the radio bearer to a respective pre-scheduling queue at the PDCP layer. Each pre-scheduling queue is associated with a service or a service quality requirement of the respective service data flow.

The transmitting radio node 12 further comprises a pre-scheduler 802 configured to pre-schedule the data packets of the respective pre-scheduling queue down to a scheduling queue at the RLC or MAC, layer.

Additionally, the transmitting radio node 12 comprises a scheduler 803 configured to schedule the data packets in the scheduling queue towards the receiving radio node 10.

The pre-scheduler 802 and/or the scheduler 803 is configured to take the prebuffer time of a data packet queued in the pre-scheduling queue into account when pre-scheduling and/or scheduling the data packets, respectively.

The pre-scheduler 802 may further be configured to take the buffer delay of the scheduling queue into account when pre-scheduling data packets down to the scheduling queue. The buffer delay in the scheduling queue may be estimated based on data volume in the scheduling queue and radio link rate towards the receiving radio node 10. The pre-scheduler 802 may also be configured to take the service or the service quality requirement into account when pre-scheduling the data packets down to the scheduling queue. In some embodiments, the scheduler 803 may be configured to take the prebuffer time of a data packet queued in the pre-scheduling queue and the buffer delay of the scheduling queue into account when scheduling the data packets. In addition, the scheduler 803 may be configured to dynamically adjust, when a delay requirement of a service data flow is not fulfilled, a priority/weight of the scheduling queue such that data packets are transmitted at a higher rate to fulfill a delay requirement of a service data flow. The pre-scheduler 802 may be configured to take the prebuffer time of a data packet queued in the pre-scheduling queue and the buffer delay of the scheduling queue into account when pre-scheduling the data packets down to the scheduling queue to meet a delay requirement associated with respective pre-scheduling queue.

The transmitting radio node 12 may further comprise a timing circuit 804 configured to time the data packet within the pre-scheduling queue to derive the prebuffer time and/or within the scheduling queue to derive the buffer time and/or the buffer delay.

The transmitting radio node 12 may further comprise an identifying circuit 805 configured to identify the at least two service data flows within the radio bearer towards the receiving radio node 10. Each service data flow is associated with the service and/or the service quality requirement, which service and/or service quality requirement is different for respective service data flow.

The transmitting radio node may further comprise a transmitting circuit 806, e.g. a transceiver, a transmitter (TX) or similar, for transmitting the scheduled data packets to the receiving radio node 10. The transmitting radio node 12 further comprises a receiver 807 (RX) that may be configured to receive data packets from the receiving radio node 10.

The transmitting radio node 12 may further comprise a receiving arrangement 808 configured to receive service data flows from the GW 13 or another transmitting radio node 12'.

The embodiments herein for scheduling service data flows may be implemented through one or more processors, such as a processing circuit 809 in the transmitting radio node 12 depicted in FIG. 8, together with computer program code for performing the functions and/or method actions of the embodiments herein. The program code mentioned above may also be provided as a computer program product, for instance in the form of a data carrier carrying computer program code for performing embodiments herein when being loaded into the transmitting radio node 12. One such carrier may be in the form of a CD ROM disc. It is however feasible with other data carriers such as a memory stick. The computer program code may furthermore be provided as pure program code on a server and downloaded to the transmitting radio node 12. Those skilled in the art will also appreciate that the various "circuits" described may refer to a combination of analog and digital circuits, and/or one or more processors configured with software and/or firmware, e.g., stored in memory, that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The transmitting radio node 12 further comprises a memory 810. The memory 810 may comprise one or more memory units and may be used to store for example data such as buffer delays, prebuffer times, quality requirements, total queue times, application/s to perform the methods herein when being executed on the transmitting radio node 12 or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a transmitting radio node for scheduling service data flows within a radio bearer towards a receiving radio node in a radio communications network, the method comprising:
   mapping data packets of at least two service data flows within the radio bearer to a respective pre-scheduling queue at a Packet Data Convergence Protocol (PDCP) layer, wherein each pre-scheduling queue is associated with a service or a service quality requirement of the respective service data flow;
   pre-scheduling the data packets of the respective pre-scheduling queue down to a scheduling queue at a Radio Link Control (RLC) or a Medium Access Control (MAC) layer; and
   scheduling the data packets in the scheduling queue towards the receiving radio node,
   wherein the pre-scheduling and/or the scheduling takes a prebuffer time of a data packet queued in the pre-scheduling queue into account when pre-scheduling and/or scheduling the data packets.

2. The method according to claim 1, wherein the pre-scheduling takes a buffer delay of the scheduling queue into account when pre-scheduling data packets down to the scheduling queue.

3. The method according to claim 2, wherein the buffer delay in the scheduling queue is estimated based on data volume in the scheduling queue and radio link rate towards the receiving radio node.

4. The method according to claim 1, wherein the pre-scheduling takes the service or the service quality requirement into account when pre-scheduling the data packets down to the scheduling queue.

5. The method according to claim 1, wherein the scheduling takes the prebuffer time of a data packet queued in the pre-scheduling queue and a buffer delay of the scheduling queue into account when scheduling the data packets.

6. The method according to the claim 5, further comprising, when a delay requirement of a service data flow is not fulfilled,
   adjusting, dynamically, a priority/weight of the scheduling queue such that data packets are transmitted at a higher rate to fulfil the delay requirement of the service data flow.

7. The method according to claim 1, wherein the pre-scheduling takes the prebuffer time of a data packet queued in the pre-scheduling queue and a buffer delay of the scheduling queue into account when pre-scheduling the data packets down to the scheduling queue to meet a delay requirement associated with respective pre-scheduling queue.

8. The method according to claim 1, further comprising:
   timing the data packet within the pre-scheduling queue to derive the prebuffer time and/or within the scheduling queue to derive a buffer delay and/or a buffer time.

9. The method according to claim 1, further comprising:
   identifying the at least two service data flows within the radio bearer towards the receiving radio node, wherein each service data flow is associated with the service and/or the service quality requirement, which service and/or service quality requirement is different for respective service data flow.

10. A transmitting radio node for scheduling service data flows within a radio bearer towards a receiving radio node in a radio communications network, wherein the transmitting radio node comprises:
    a mapping circuit configured to map data packets of at least two service data flows within the radio bearer to a respective pre-scheduling queue at a Packet Data Convergence Protocol (PDCP) layer, wherein each pre-scheduling queue is associated with a service or a service quality requirement of the respective service data flow;
    a pre-scheduler configured to pre-schedule the data packets of the respective pre-scheduling queue down to a scheduling queue at a Radio Link Control, RLC, or a Medium Access Control (MAC) layer; and
    a scheduler configured to schedule the data packets in the scheduling queue towards the receiving radio node, wherein the pre-scheduler and/or the scheduler is configured to take a prebuffer time of a data packet queued in the pre-scheduling queue into account when pre-scheduling and/or scheduling the data packets.

11. The transmitting radio node according to claim 10, wherein the pre-scheduler is further configured to take a buffer delay of the scheduling queue into account when pre-scheduling data packets down to the scheduling queue.

12. The transmitting radio node according to claim 11, wherein the buffer delay in the scheduling queue is estimated based on data volume in the scheduling queue and radio link rate towards the receiving radio node.

13. The transmitting radio node according to claim 10, wherein the pre-scheduler is further configured to take the service or the service quality requirement into account when pre-scheduling the data packets down to the scheduling queue.

14. The transmitting radio node according to claim 10, wherein the scheduler is configured to take the prebuffer time of a data packet queued in the pre-scheduling queue and a buffer delay of the scheduling queue into account when scheduling the data packets.

15. The transmitting radio node according to the claim 14, wherein the scheduler is further configured to dynamically adjust, when a delay requirement of a service data flow is not fulfilled, a priority/weight of the scheduling queue such that data packets are transmitted at a higher rate to fulfil the delay requirement of the service data flow.

16. The transmitting radio node according to claim 10, wherein the pre-scheduler is configured to take the prebuffer time of a data packet queued in the pre-scheduling queue and a buffer delay of the scheduling queue into account when pre-scheduling the data packets down to the scheduling queue to meet a delay requirement associated with respective pre-scheduling queue.

17. The transmitting radio node according to claim 10, further comprising:
   a timing circuit configured to time data packets within the pre-scheduling queue to derive the prebuffer time and/or within the scheduling queue to derive a buffer delay and/or a buffer time.

18. The transmitting radio node according to claim 10, further comprising:
   an identifying circuit configured to identify the at least two service data flows within the radio bearer towards the receiving radio node, wherein each service data flow is associated with the service and/or the service quality requirement, which service and/or service quality requirement is different for respective service data flow.

* * * * *